United States Patent
Oklejas, Jr.

(10) Patent No.: US 8,377,302 B2
(45) Date of Patent: Feb. 19, 2013

(54) CONTINUOUS PROCESS BATCH-OPERATED REVERSE OSMOSIS SYSTEM WITH IN-TANK MEMBRANES AND CIRCULATION

(75) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 0 days.

(21) Appl. No.: 13/548,547

(22) Filed: Jul. 13, 2012

(65) Prior Publication Data
US 2012/0279923 A1  Nov. 8, 2012

Related U.S. Application Data

(62) Division of application No. 12/706,811, filed on Feb. 17, 2010, now Pat. No. 8,231,784.

(51) Int. Cl.
  B01D 63/06 (2006.01)
  B01D 63/00 (2006.01)
  B01D 61/08 (2006.01)
  B01D 61/00 (2006.01)
(52) U.S. Cl. ............ 210/321.6; 210/652; 210/257.2; 210/258; 210/438; 210/321.89
(58) Field of Classification Search .......... None
See application file for complete search history.

(56) References Cited

U.S. PATENT DOCUMENTS

| | | | | |
|---|---|---|---|---|
| 3,893,920 A * | 7/1975 | Hubbard et al. | ......... | 210/197 |
| 4,702,842 A * | 10/1987 | Lapierre | ......... | 210/651 |
| 4,814,086 A * | 3/1989 | Bratt | ......... | 210/636 |
| 5,096,583 A * | 3/1992 | Roux et al. | ......... | 210/321.6 |
| 6,251,271 B1 * | 6/2001 | Hagqvist | ......... | 210/195.2 |
| 6,547,965 B1 * | 4/2003 | Chancellor | ......... | 210/321.66 |
| 7,192,522 B2 * | 3/2007 | Grangeon et al. | ......... | 210/416.1 |
| 7,285,209 B2 * | 10/2007 | Yu et al. | ......... | 210/195.2 |
| 2004/0007526 A1 * | 1/2004 | Dellby et al. | ......... | 210/650 |
| 2007/0023347 A1 * | 2/2007 | Chabot | ......... | 210/321.6 |

* cited by examiner

*Primary Examiner* — Krishnan S Menon
(74) *Attorney, Agent, or Firm* — Harness Dickey & Pierce (57) ABSTRACT

A reverse osmosis system and method for operating the same includes a pressure tank having a first end and a second end, the pressure tank has a first volume adjacent to the first end and a second volume adjacent to the second end and a third volume between the first volume and the second volume and a fluid passage fluidically coupling the second volume to the first volume. The reverse osmosis system also includes a plurality of membranes disposed within the third volume generating permeate and a permeate manifold receiving permeate from the membranes and fluidically communicating permeate out of the pressure tank. A feed line couples feed fluid into the pressure tank. A first pump pressurizes the feed line. A second pump is disposed within the tank and circulates brine fluid from the second volume through the fluid passage.

7 Claims, 8 Drawing Sheets

CONTINUOUS PROCESS BATCH-OPERATED REVERSE OSMOSIS SYSTEM WITH IN-TANK MEMBRANES AND CIRCULATION

CROSS-REFERENCE TO RELATED APPLICATIONS

This application claims the benefit of U.S. application Ser. No. 12/706,811 filed on Feb. 17, 2010. The disclosure of the above application is incorporated herein by reference.

TECHNICAL FIELD

The present disclosure relates generally to reverse osmosis systems, and, more specifically, to a batch operated reverse osmosis system that may be operated as a continuous process.

BACKGROUND

The statements in this section merely provide background information related to the present disclosure and may not constitute prior art.

Reverse osmosis systems are used to provide fresh water from brackish or sea water. A membrane is used that restricts the flow of dissolved solids therethrough.

A reverse osmosis system involves pressurizing a solution with an applied pressure greater than an osmotic pressure created by the dissolved salts within the solution. The osmotic pressure is generally proportional to the concentration level of the salt. The approximate osmotic pressure in pounds-per-square-inch is the ratio of the salt mass to water mass times 14,000. A one-percent solution of salt would have an osmotic pressure of about 140 psi. Ocean water typically has a 3.5 percent concentration and an osmotic pressure of 490 psi.

Water extracted from a reverse osmosis system is called permeate. As a given batch of saline solution is processed by the reverse osmosis membrane, the concentration of the solution is increased. At some point, it is no longer practical to recover permeate from the solution. The rejected material is called brine or the reject. Typically, about 50% of recovery of permeate from the original volume of sea water solution reaches the practical limit in standard seawater RO systems.

Reverse osmosis systems typically have several components that are under very high pressures that may exceed 1,000 psi. These components include membrane housings, brine tanks, pumps and interconnecting pipes. Providing reinforced components increases the cost of the reverse osmosis system.

SUMMARY

This section provides a general summary of the disclosure, and is not a comprehensive disclosure of its full scope or all of its features.

The present disclosure provides a system that reduces the number of components that must be reinforced to withstand pressures compared to prior known systems.

In one aspect of the invention, a reverse osmosis system includes a pressure tank having a first end and a second end, the pressure tank has a first volume adjacent to the first end and a second volume adjacent to the second end and a third volume between the first volume and the second volume and a fluid passage fluidically coupling the second volume to the first volume. The reverse osmosis system also includes a plurality of membranes disposed within the third volume generating permeate and a permeate manifold receiving permeate from the membranes and fluidically communicating permeate out of the pressure tank. A feed line couples feed fluid into the pressure tank. A first pump pressurizes the feed line. A second pump is disposed within the pressure tank and circulates brine fluid from the second volume through the fluid passage.

In another aspect of the invention, a method of performing reverse osmosis in a system that includes a pressure tank having a first end and a second end, the pressure tank has a first volume adjacent to the first end, a second volume adjacent to the second end and a third volume between the first volume and second volume and a fluid passage fluidically coupling the second volume to the first volume includes communicating feed fluid to the pressure tank, increasing the pressure within pressure tank with a pump disposed within the inner chamber, generating permeate at a plurality of membranes disposed within the third volume, fluidically communicating the permeate out of the pressure tank and circulating brine from the membranes from the second volume to the first volume using a circulation pump.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 1:
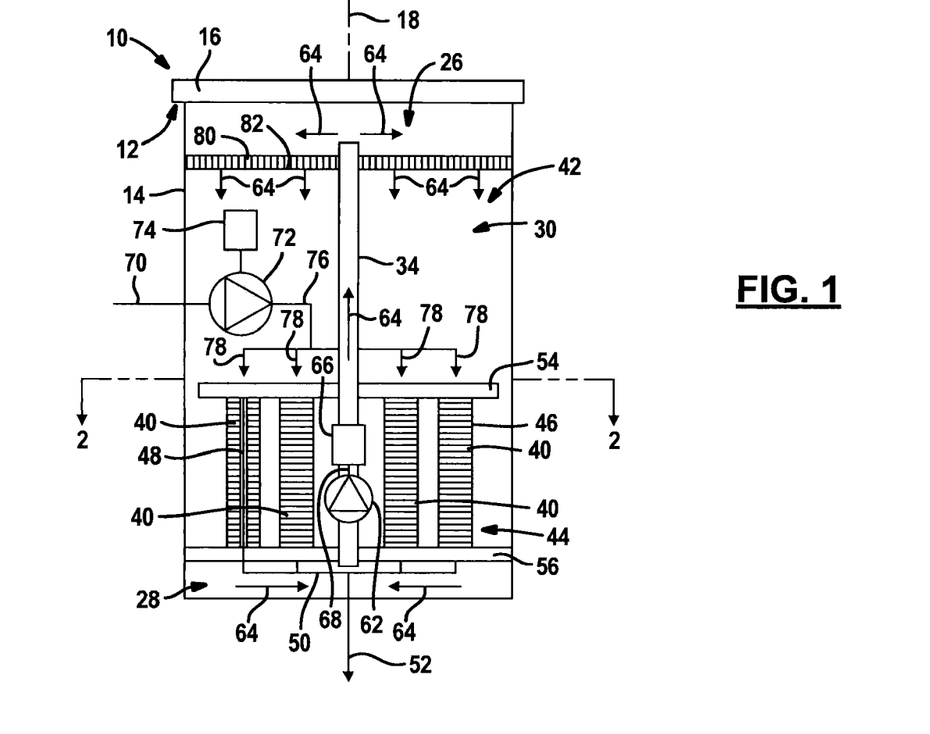
FIG. 1 is a cross-sectional view of a first embodiment of a reverse osmosis system according to the present disclosure.

Referring now to FIG. 1, a first embodiment of a reverse osmosis system 10 is illustrated. The reverse osmosis system 10 includes a pressure tank 12 that includes a housing 14 and a cover 16. The housing 14 may be a cylindrical housing having a longitudinal axis 18. A cover 16 is securely fastened to the housing 14 during the reverse osmosis process to maintain a pressurized condition therein. The cover 16 may be opened for servicing components within the pressure tank 12. The pressure tank 12 may have a longitudinal axis 18 should the system be cylindrical.

The pressure tank 12 may be divided into three different volumes that include a first volume 26 (adjacent to a first end of the pressure tank 12, as illustrated in FIG. 1), a second volume 28 (adjacent to the second end of the pressure tank 12) and a third volume 30 (between the first volume 26 and the second volume 28). The first volume 26 is separated from the second volume 28 by the third volume 30.

A fluid passage 34 may communicate fluid between the second volume 28 and the first volume 26. The fluid communication process will be further described below. The fluid passage 34 may be formed by a pipe between the first volume 26 and the second volume 28.

A plurality of membranes 40 are disposed in the third volume 30. The membranes 40 may be arranged away from a first end 42 of the third volume near a second end 44 of the inner chamber 30. The membranes 40 may be disposed within a membrane housing or tube 46. The membranes 40 allow permeate to pass therethrough. Permeate is collected in a collection pipe 48 which is disposed in each of the membrane housings 46. Only one collection pipe 48 for one membrane 40 is illustrated for simplicity. Each membrane has a collection pipe 48. Each permeate collection pipe 48 is in fluid communication with a permeate manifold 50. The permeate manifold 50 fluidically communicates the permeate out of the pressure tank 12 using a permeate outlet pipe 52.

The membrane housings 46 may be secured by one or more tube sheets. In this example, a first tube sheet 54 and a second tube sheet 56 are used. The tube sheets 54, 56 may be formed from various lightweight material since differential pressures acting on the tube sheets are low. The tube sheets 54, 56 may, for example, be formed from a sheet metal, plastic or other lightweight material. The tube sheet 56 may be sealed to or against the wall of housing 14. The tube sheet 54 may not extend across to housing 14. At least one tube sheet 54, 56 separates and prevents the flow of brine directly between the second volume 28 and third volume 30. The sheets 54, 56 ensure the brine passes through tubes 46. In this embodiment, the tube sheets 54, 56 orient the housings 46 in a direction parallel with the longitudinal axis 18 of the pressure tank 12. A number of housings 46 and thus a number of membranes 40 may be disposed within the pressure tank 12. As will be illustrated below, sixteen housings 46 and thus sixteen membranes 40 are disposed. Various numbers of membranes 40 may be used.

A circulation pump 62 is used to circulate fluid from the second volume 28 to the first volume 26. The movement of fluid from the second volume 28 circulates through the fluid passage 34 to the first volume 26 and ultimately into the third volume 30. The direction of circulation is illustrated by arrows 64.

The circulation pump 62 may be driven by a motor 66. The motor 66 may be a submersible motor 66. The motor 66 may be located at various locations within the second volume 28 or within the third volume 30 including directly adjacent to the pump or included as part of the circulation pump 62. The motor 66 may be coupled to the pump 62 by a shaft 68 extending therebetween. The circulation pump 62 may be located in other places within the pressure tank 12 including within the first volume 26.

A low-pressure supply pipe 70 may be used for supplying low-pressure feed fluid into the pressure tank 12. More specifically, the feed pump 72 may communicate low-pressure feed fluid through the housing 14. The feed pump 72 may be in fluid communication with the supply pipe 70. The feed pump 72 may increase the pressure of the low-pressure fluid. The feed pump 72 may be coupled to a feed motor 74. The feed motor 74 may be a submersible motor used for driving the feed pump 72. The feed pump 72 may have an output in fluid communication with a feed manifold 76. The feed manifold 76 may have a plurality of feed manifold outlets 78. The feed manifold outlets 78 may be disposed adjacent to or near an end of the membrane housings 46 nearest the first end 42. Thus, fresh feed fluid is thus provided near the membranes and reduce mixing with the increased salinity fluid within the pressure tank is achieved.

The pump 72, the motor 74, the feed manifold 76 and the feed manifold outlet 78 may all be disposed within the third volume 30.

A distribution plate 80 may be disposed across pressure tank 12. The distribution plate 80 may be mechanically coupled to the inner wall 14 of the pressure tank 12. Various fastening means may be used. Removable fasteners allow access to the membranes after the cover is removed. The distribution plate 80 may have vanes 82 used for evenly distributing the fluid that is recirculated through the fluid passage 34 and minimizing the turbulence and mixing of the elements within the third volume 30.

In operation, low-pressure feed fluid is provided through the feed pipe 70. The pump 72 increases the pressure of the feed and also increases the pressure within the pressure tank 12. The feed fluid is communicated adjacent to the membranes 40. After pressure has risen above the osmotic pressure, permeate from the permeate collection tube 48 is removed from the pressure tank 12 by the permeate manifold 50. The circulation pump 62 circulates brine fluid in the second volume 28 through the fluid passage 34 to the first volume 26. The recirculated brine fluid from the first volume then enters the third volume 30 through the distribution plate 80. Fluid then passes through membrane 40 to second volume 28.

Figure 2:
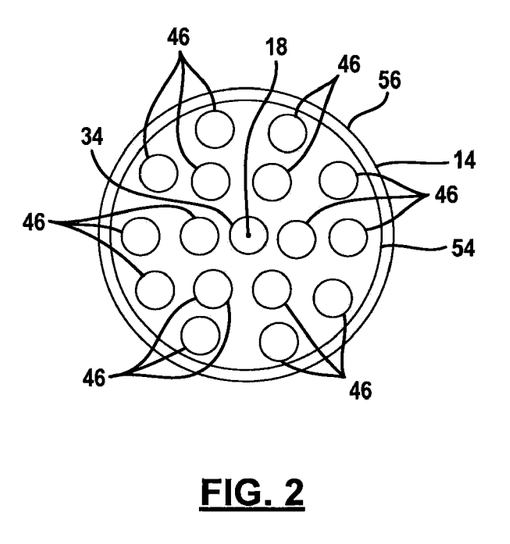
FIG. 2 is a radial cross-sectional view of the tube sheet of FIG. 1.

Referring now to FIG. 2, a cross-sectional view of a tube sheet 56 taken in a direction perpendicular to the longitudinal axis 18 is set forth. As is illustrated, a plurality of membrane housings 46 are illustrated. In this embodiment, sixteen membrane housings are illustrated. However, various numbers of membrane housings including only one membrane housing may be provided. The tube sheet 54 may also be configured in a similar manner. The tube sheet 56 forces brine fluid to pass through the housing 46 and the brine fluid not converted into permeate is routed into the second volume 28. The tube sheet 54 allows fluid to enter the membrane housing 46 from the third volume 30.

Figures 3, 4, 5:
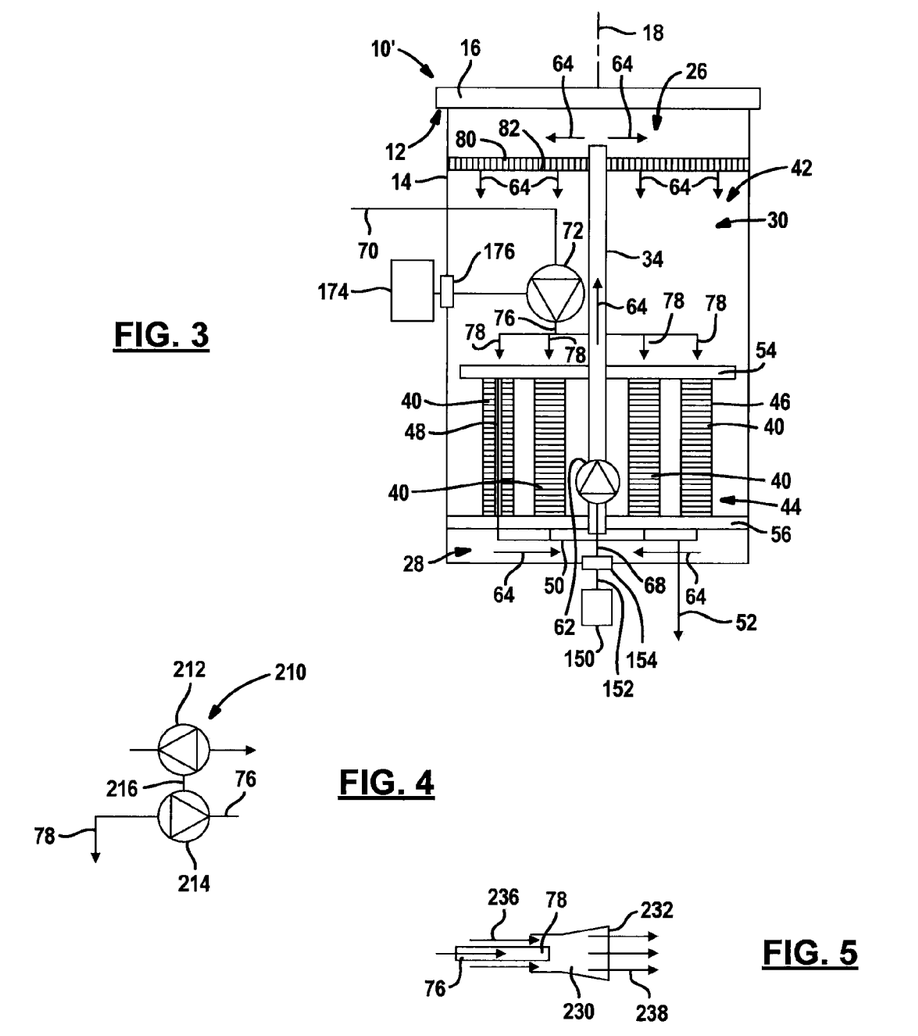
FIG. 3 is a cross-sectional view of a second embodiment of the present disclosure.
FIG. 4 is a schematic view of a turbocharger for use in an alternative configuration of FIG. 1.
FIG. 5 is a cross-sectional view of an eductor according to the present disclosure.

Referring now to FIG. 3, a second embodiment of a reverse osmosis system 10' is illustrated. In this embodiment, the motor 74 of FIG. 1 is replaced with motor 174 and a shaft seal 176 in the housing 14 of the pressure tank. The motor 174 is located outside of the pressure tank 12 and may provide a lower cost and high-efficiency motor than the submersible motor 74 illustrated in FIG. 1. A shaft seal 176 seals the motor shaft 178 from leakage from the pressure tank 12.

A non-submersible recirculation motor 150 may also be provided in place of the recirculation motor 50. The recirculation motor 150 may also have a shaft 152 that is sealed in the exterior wall of the pressure tank 12 by a shaft seal 154. The motor 150 is coupled to the recirculation pump 62 that operates as is described in the description of FIG. 1. The remaining elements and the operation of the second embodiment of the reverse osmosis system 10' is the same as described above with respect to FIG. 1.

Referring now to FIG. 4, the circulation pump 62 and the recirculation motor 50 of FIG. 1 may be replaced by a turbocharger 210. The turbocharger 210 may include a pump portion 212 and a turbine portion 214. A common shaft 216 may be used to rotate the pump 212 in response to the rotation of the turbine 214.

The turbine 214 may be in fluid communication with the pipe 76 and outlet 78. The feed flow through the pipe 76 rotates the turbine which in turn rotates the pump 212 to generate a recirculation current or flow within the pressure tank 12.

Referring now to FIG. 5, the outlets 78 may include an eductor 230. The eductor 230 induces brine circulation. The brine flow from the feed pump 72 is expelled at higher pressure due to the energizing effect of the high-feed flow velocity from the feed pump 72. The outlet 232 of the eductor 230 receives the feed fluid from the pump 72 which is mixed with brine fluid 236 and thus the combined fluid 238 may not flow through a manifold 76 as described above.

Figure 6:
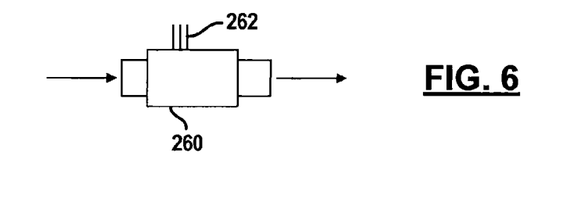
FIG. 6 is an electromagnetic pump that may be used in place of the recirculation pump of FIG. 1.

Referring now to FIG. 6, an electromagnetic pump may replace the pump 62 and motor 66 illustrated in FIG. 1. The electromagnetic pump 260 may also replace the motor 150 and pump 62 illustrated in FIG. 3. Power lines 262 provide power to the electromagnetic pump to create electric currents and magnetic fields to provide a pumping action in the highly conductive brine fluid. The electromagnetic pump 260 has no moving parts and thus has increased reliability.

Figure 7:
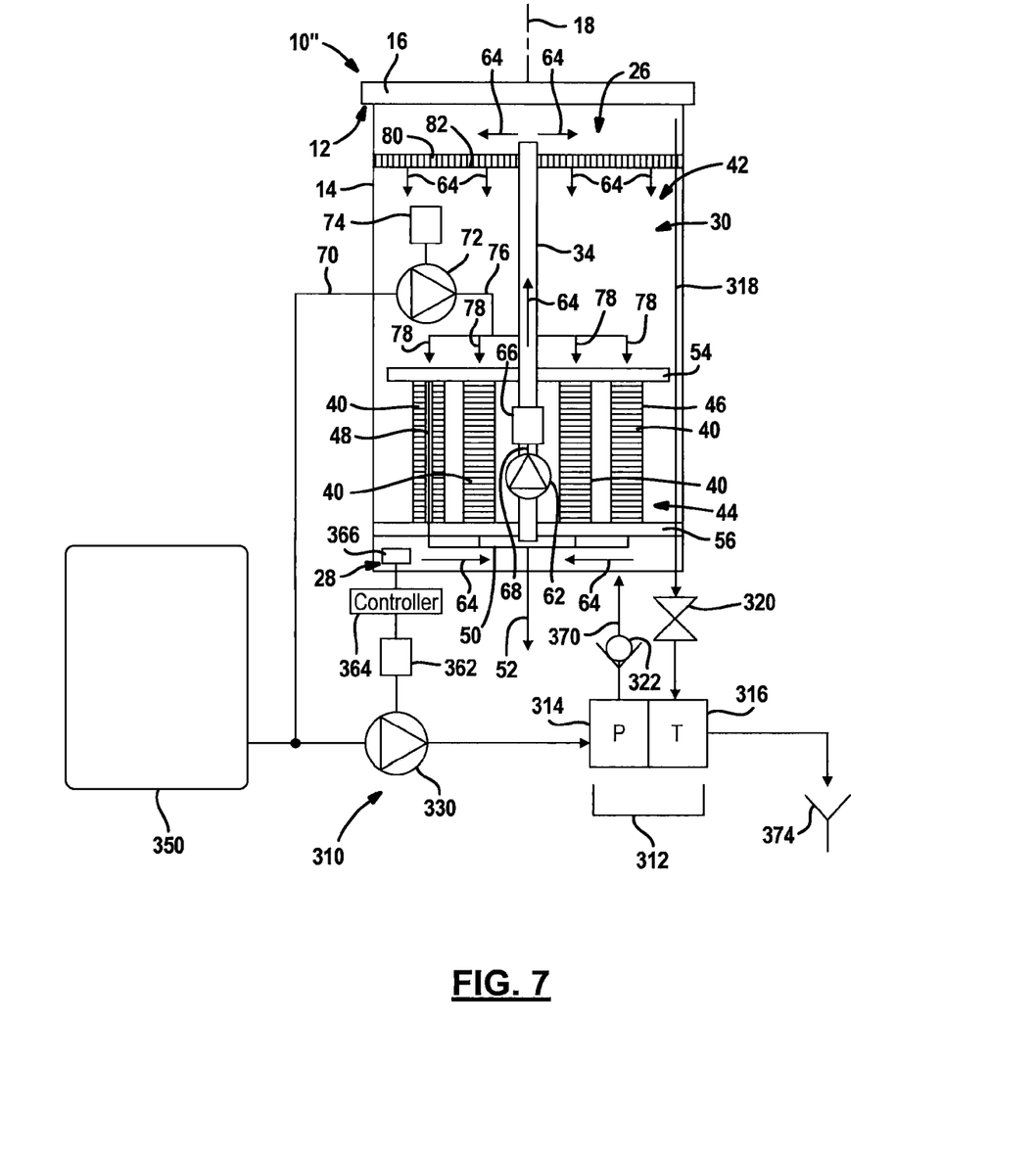
FIG. 7 is a cross-sectional view of a third embodiment of the reverse osmosis system.

Referring now to FIG. 7, another embodiment of the reverse osmosis system 10" similar to FIG. 1 is illustrated having a recharging arrangement 310. The recharging arrangement 310 allows continuous operation in a single-batch tank by purging of the brine with fresh feed once a maximum concentration has been reached in the pressure tank 12. Brine is depressurized as it leaves the tank and incoming feed is pressurized before entering the tank. A turbocharger 312 may be used to recover some of the energy lost in the process. The turbocharger 312 includes a pump portion 314 and a turbine portion 316. The turbine portion 316 provides brine fluid through brine pipe 318. The brine pipe 318 may provide brine fluid to the turbine portion 316 through a valve 320. The pump portion 314 may inject feed fluid under high pressure through a check valve 322. In addition to the increase in pressure from the pump portion 314, a charge pump 330 may be used to increase the pressure in the feed fluid. The feed fluid for the pump 330 may be provided from a feed tank 350. The feed tank 350 may also provide feed fluid to the pump 72.

The charge pump 330 may be operated by a motor 362. The motor may be controlled by a controller 364. The controller 364 may be a variable frequency drive that is operated in response to a pressure sensor 366. The charge pump 330 operates during the recharge process. When the batch process has reached a final brine concentration, the pump 330 is energized and the valve 320 is opened allowing the brine to be drawn in from the first volume 26 through pipe 318. The brine from the first volume 26 is at a high pressure and thus the turbine portion 316 is rotated which in turn rotates the pump portion 314 to increase the pressure in the feed from the feed tank 350. The check valve 322 opens when the pressure is sufficient to overcome the pressure tank pressure and allow the feed into the pressure tank within the second volume 28. When providing the feed into the inlet 370, flow within the pressure tank 14 is opposite to the arrows 64. The combination of the reversal of flow and the high rate of input from the fresh feed from the feed tank through the feed inlet 370 may reduce scale and foulants from the membrane which may be carried out through the pipe 318 during the process. The inlet may be at various locations including in the center of the lower surface of the pressure tank. Feed fluid from the pipe 370 may also travel up the membrane housings to reduce and remove the foulants from the membrane 40. The speed of the pump 330 may be controlled by the controller 364 which controls the speed of the motor 362. Fluid from the pipe 318 that passes through the turbine 360 may be input to a drain 374 at a reduced pressure.

The fluid that enters the drain 374 has a significantly lower pressure than the fluid from the pipe 318 as reduced by the turbine portion 316.

Figure 8:
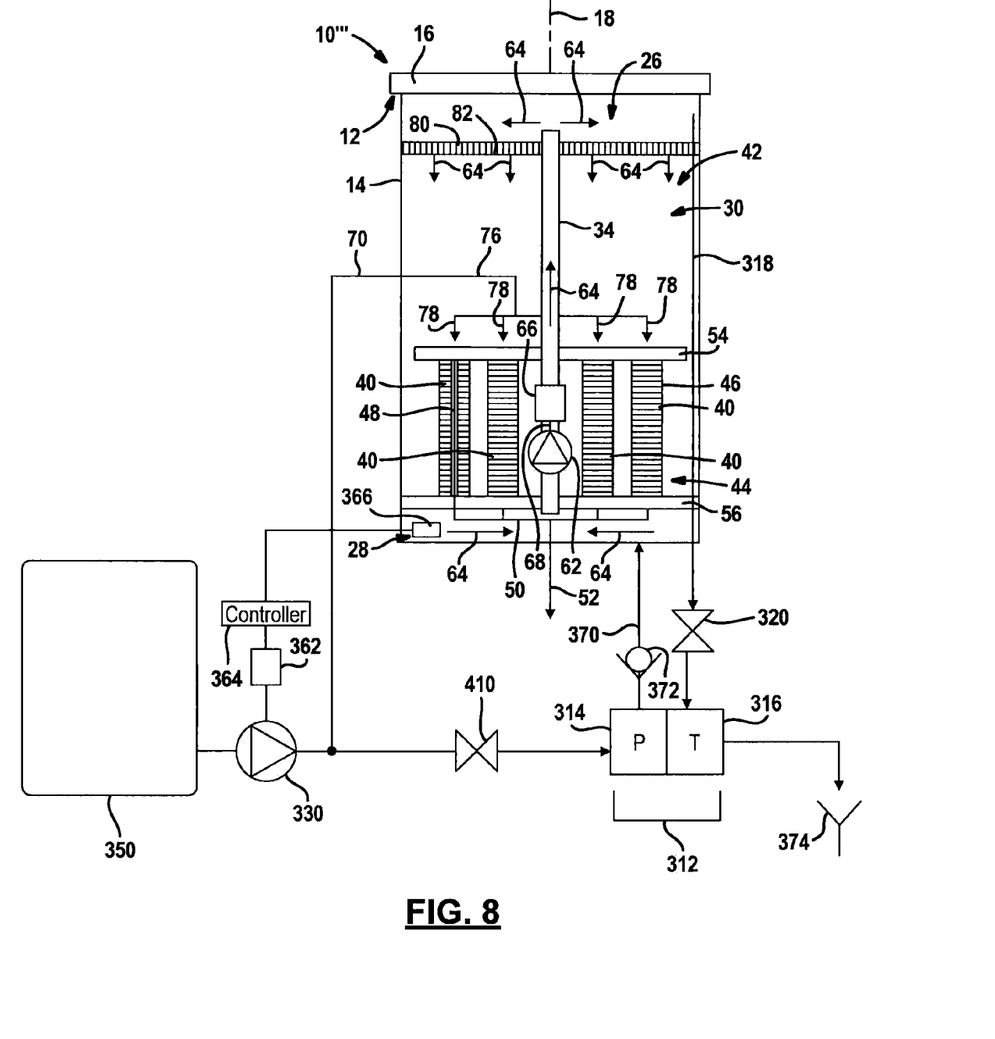
FIG. 8 is a cross-sectional view of a fourth embodiment of the present disclosure.

Referring now to FIG. 8, another embodiment of the reverse osmosis system 10''' similar to that of FIG. 7 is illustrated having the motor 74 and pump 72 removed and controlled by the charge pump 330 and motor 362. In this embodiment the charge pump 330 is provided directly after the feed tank 350. After the charge pump 330, fluid may flow into the fluid manifold or into the turbocharger 312. A valve 410 may be provided between the charge pump 330 and the turbocharger 312 to selectively control the input to the pump portion 322. During recharge the valve 410 is opened to allow feed fluid to flow from the feed tank 350 through the charge pump 330 and into the pressure tank 312 as described above. In this embodiment, the additional pump within the third volume 30 is removed. Valves 410 and 320 are closed during batch operation and opened during recharge operation.

Figure 9:
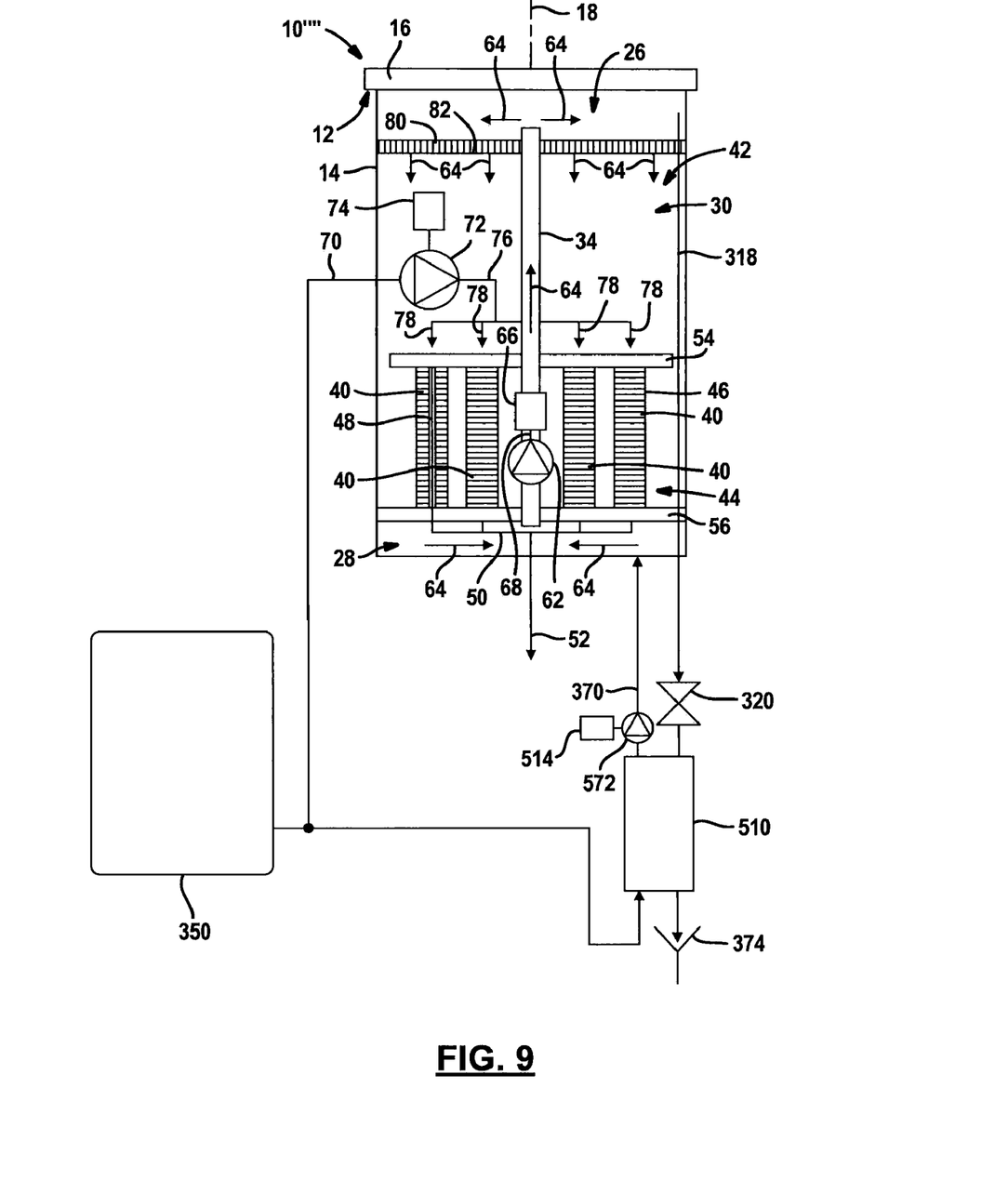
FIG. 9 is a cross-sectional view of a fifth embodiment of the reverse osmosis system according to the present disclosure.

Referring now to FIG. 9, another embodiment of the reverse osmosis system 10'''' similar to FIG. 7 is illustrated. In this embodiment, a work exchanger 510 replaces the turbocharger 312. The work exchanger 510 is used to receive high-pressure fluid from the first volume 26 through the valve 320 which is open during the recharge process and convert the work to useful energy (to pressurize the feed fluid into the pressure tank 12). Feed fluid is provided into the pressure tank 12 using a booster pump 572 that is coupled to a booster motor 514. The recharge process uses the flow work exchanger 510 to inject fresh feed into the pressure tank while removing an equal volume of concentrate through the pipe 318. The booster pump 572 is used to make up for pressure loss in the piping and the work exchanger 510. During the recharge process, the valve 320 is opened and the pump 512 is energized using motor 514. The pump 72 may continue to operate during the recharge process and thus the permeate production continues without interruption.

Figure 10:
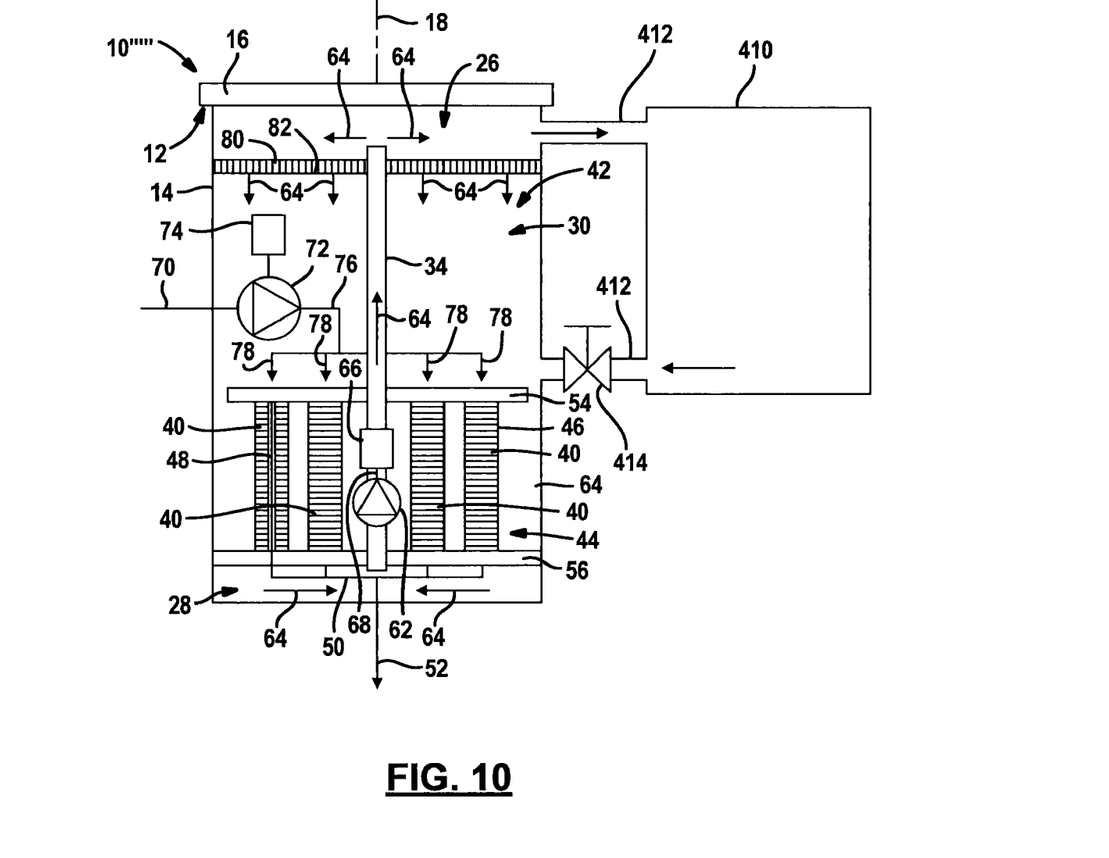
FIG. 10 is a cross-sectional view of a sixth embodiment of the reverse osmosis system according to the present disclosure.

Referring now to FIG. 10, an embodiment of a reverse osmosis system 10''''' similar to FIG. 1 is illustrated. In this embodiment, an additional tank 410 is fluidically coupled to the pressure tank 12. The tank 410 may have an inlet pipe 412 that fluidically communicated fluid from the first volume of the pressure tank 12 into the fluid tank 410. Fluid is provided from the fluid tank 410 through an outlet pipe 412. The outlet pipe 412 may fluidically couple fluid into the third volume of the pressure tank 12. A valve 414 may be used to control the flow out of the tank 410. The tank 410 increases the amount of feed that can be processed by a batch.

Figure 11:
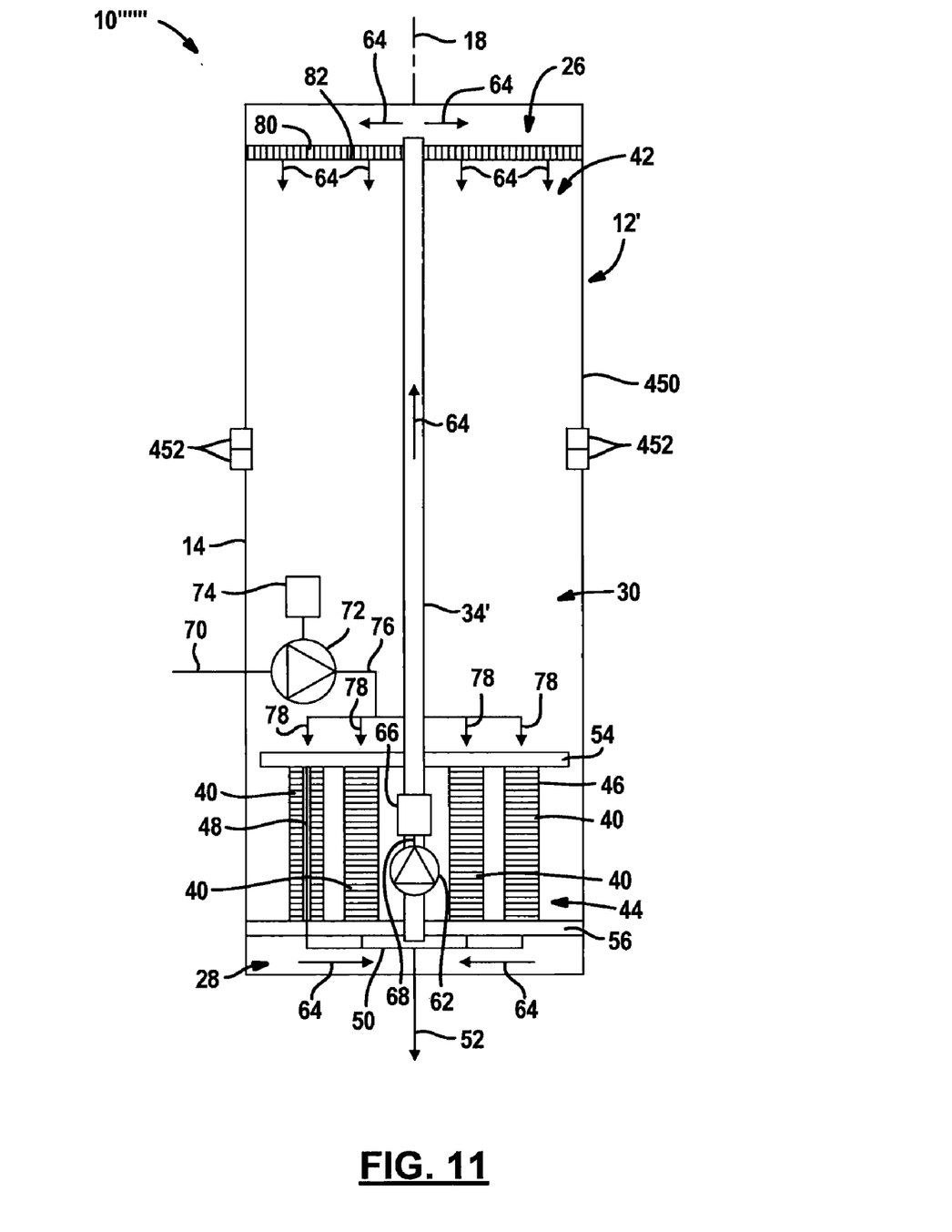
FIG. 11 is a cross-sectional view of a seventh embodiment of the reverse osmosis system according to the present disclosure.

Referring now to FIG. 11, another embodiment similar to FIG. 1 is illustrated. In this embodiment, the pressure tank 12' is increased in length to increase the amount of fluid volume within the tank to insure a sufficiently long batch run. When the feed total dissolved solids (TDS) is high then additional tank volume may be needed to insure a sufficiently long batch run. When the total dissolved solids are low, the smaller tank volume may be more appropriate. A tank extender 450 with seals 452 may be used to increase the length of the tank 12'. Mechanical fasteners or the like may be used to mechanically couple the extender 450 to the housing 14 of the previous embodiments. The fluid passage 34' may also be extended so that fluid from the second volume 28 may be communicated to the first volume 26.

Figure 12:
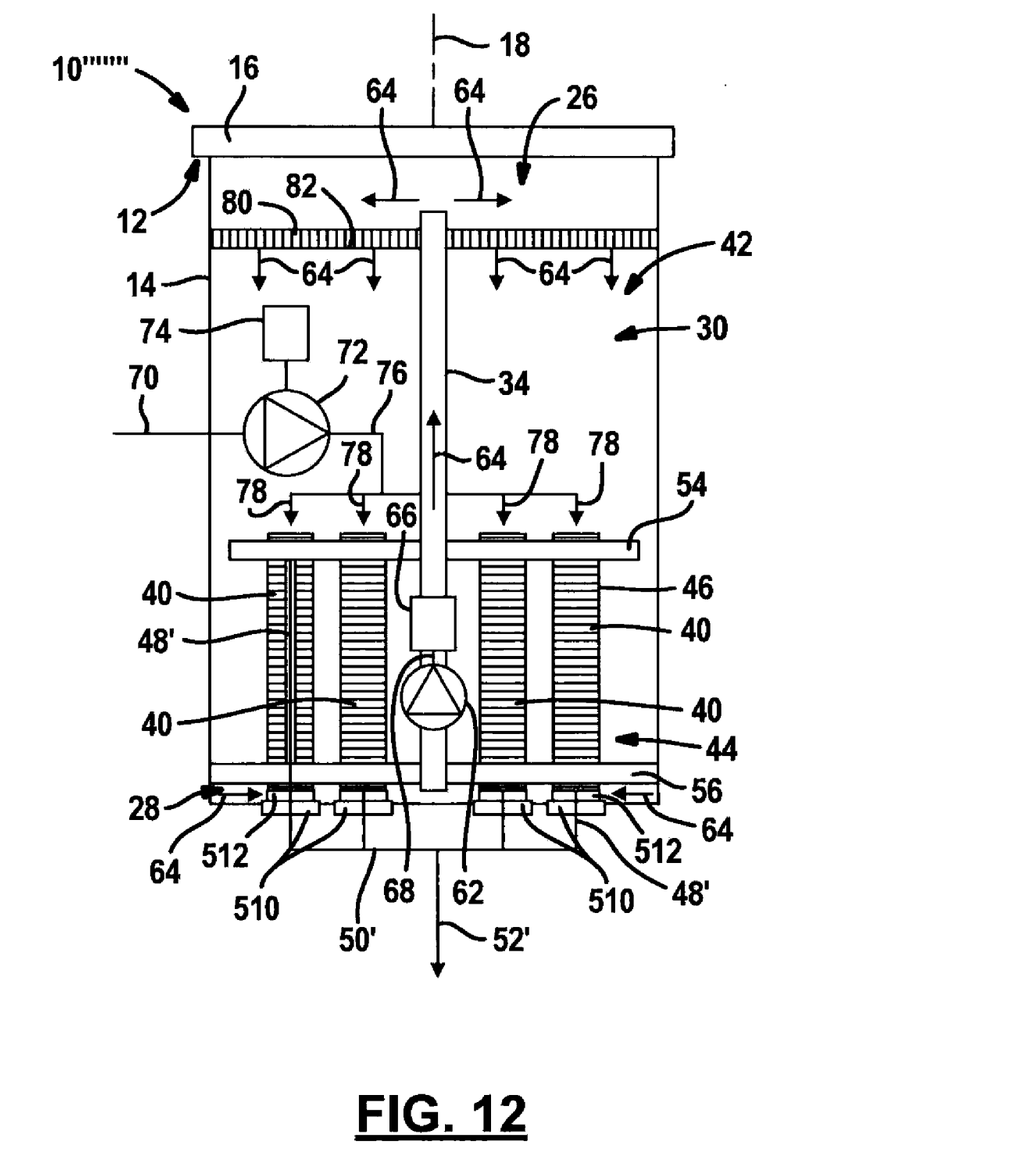
FIG. 12 is a cross-sectional view of an eighth embodiment of the reverse osmosis system according to the present disclosure.

Referring now to FIG. 12, another embodiment similar to FIG. 1 is provided. In this example, easy access so that the membranes 40 may be easily replaced is provided. In this embodiment, the membrane tubes 46 extend through the second tube sheet 56. Brine fluid from the membrane tubes 46 still enters the second volume 28.

A plurality of covers 510 is secured within the housing 14. The covers 510 are adjacent to the membranes 40 so that the membranes may be easily removed from within the pressure tank 12. The covers 510 may be coupled to the bottom of the housing 14 by various methods, including, but not limited to, bolting, snap rings, or other suitable methods. In this embodiment, the permeate manifold 50' is located outside of the pressure tank 12. The collection tubes 48' extend through the covers 510. To access the membrane elements, the covers 510 are removed. Prior to removal of the covers 510, the collection tubes 48' may be disassembled to allow disassembly of the covers 510.

A spacer 512 may be used to allow brine fluid exiting from the membrane to flow to the fluid passage 34. The spacer 512 may be a separate structure or mechanically coupled to the covers 510.

It should be noted that the various components of the disclosure for each of the figures may be interchanged. For example, either or both motors may be located outside the pressure tank or within the pressure tank 12. Likewise, the recharging systems illustrated in FIGS. 7-12 may also be interchanged with themselves or the other components. The alternative components of FIGS. 4-6 may be individual in any embodiment separately or in combination.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of performing reverse osmosis in a system that includes a pressure tank having a first end and a second end, the pressure tank has a first volume adjacent to the first end, a second volume adjacent to the second end and a third volume between the first volume and second volume and a fluid passage fluidically coupling the second volume to the first volume, said method comprising:
   communicating feed fluid to the pressure tank through an input manifold fluidically coupled to a feed line, the input manifold has a plurality of outlets disposed adjacent to a respective input end of a membrane within the third volume;
   increasing the pressure within pressure tank with a pump;
   generating permeate at a plurality of membranes disposed within the third volume;
   fluidically communicating the permeate out of the pressure tank;
   circulating brine from the membranes from the second volume to the first volume using a circulation pump;
   preventing brine from directly passing between the second volume and third volume using a tube sheet and membrane housings having the membranes disposed therein; and
   passing fluid from the first volume to the third volume through a distribution plate.

2. A method as recited in claim 1 wherein the steps of communicating, increasing, generating, fluidically communicating and circulating are performed during batch operation of the pressure tank.

3. A method as recited in claim 2 further comprising, during recharge operation of the pressure tank, performing the steps of:
   removing brine fluid from the pressure tank; and
   introducing recharging feed fluid into the pressure tank.

4. A method as recited in claim 2 wherein removing brine fluid from the tank comprises removing brine fluid from the first volume of the tank and wherein introducing recharging feed comprise introducing recharging feed into a second volume of the pressure tank.

5. A method as recited in claim 2 wherein removing brine fluid from the tank comprises removing brine fluid from the tank through a turbine portion of a turbocharger and wherein introducing recharging feed fluid into the pressure tank comprises introducing feed fluid into the pressure tank through a charge pump coupled to the turbine, and further comprising increasing the recharging feed fluid pressure with the charge pump.

6. A method as recited in claim 1 wherein communicating feed fluid into the pressure tank comprises communicating feed fluid into the pressure tank through a feed supply coupled to the charge pump.

7. A method as recited in claim 1 wherein communicating feed fluid comprises communicating feed fluid into the pressure tank adjacent to the membranes through an eductor.

* * * * *